United States Patent
Föhl

[11] Patent Number: 5,265,813
[45] Date of Patent: Nov. 30, 1993

[54] PRETENSIONER IN A SAFETY BELT SYSTEM FOR VEHICLES

[75] Inventor: Artur Föhl, Schorndorf, Fed. Rep. of Germany

[73] Assignee: TRW Repa GmbH, Alfdorf, Fed. Rep. of Germany

[21] Appl. No.: 833,846

[22] Filed: Feb. 4, 1992

[30] Foreign Application Priority Data

Feb. 5, 1991 [EP] European Pat. Off. ........ 91101504.8

[51] Int. Cl.⁵ ............................................. B60P 22/46
[52] U.S. Cl. .................... 242/107; 280/806; 242/107.4 A
[58] Field of Search ............... 242/107, 107.5, 107.2, 242/107.3, 107.6, 107.7, 107.4 A, 107.4 B; 280/806, 807, 801; 292/480; 297/478, 480

[56] References Cited

U.S. PATENT DOCUMENTS

| | | | |
|---|---|---|---|
| 4,830,310 | 5/1989 | Higbee | 242/107.7 |
| 4,917,210 | 4/1990 | Danicek | 280/806 |
| 5,149,128 | 9/1992 | Fohl | 280/806 |
| 5,152,552 | 10/1992 | Ikegaya | 280/806 |

Primary Examiner—William A. Cuchlinski, Jr.
Assistant Examiner—William C. Dowling
Attorney, Agent, or Firm—Tarolli, Sundheim & Covell

[57] ABSTRACT

In a pretensioner for safety belt systems in vehicles a mechanical drive having a pretensioned spring is provided. The spring is held in its pretensioned state by a trigger mechanism. For initiating a pretensioning operation the spring is released by the trigger mechanism. The vehicle-sensitive sensor mass of said trigger mechanism is provided substantially by the mass of the spring itself and the smaller mass of a guide tube which receives the spring and is pivotal relatively to the bearing housing of the belt retractor against the force of a spring.

17 Claims, 3 Drawing Sheets

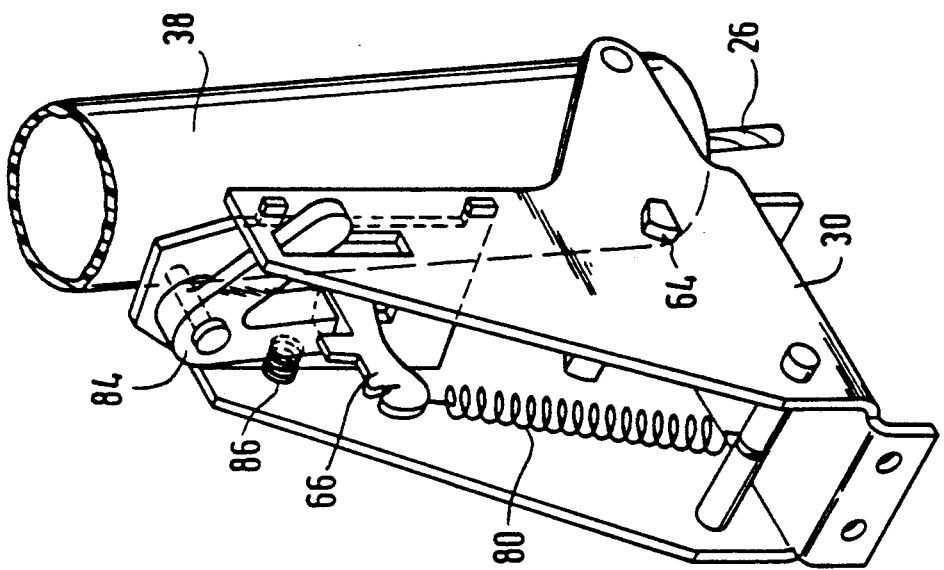
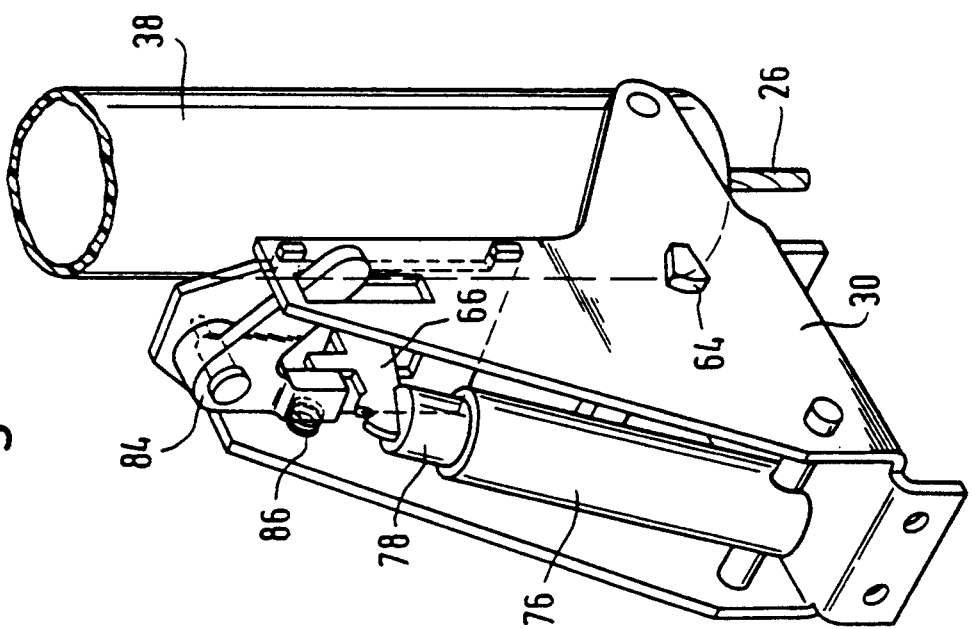

PRETENSIONER IN A SAFETY BELT SYSTEM FOR VEHICLES

The invention relates to a pretensioner in a safety belt system for vehicles comprising a mechanical pretensioning drive which has a pretensioned helical spring and engages the shaft of a belt retractor, and a trigger mechanism which holds a spring in its pretensioned state and releases said spring in vehicle-sensitive manner for initiating a belt pretensioning operation.

The effectiveness of pretensioners for protecting the vehicle occupants in a collision is an established fact. The only factor preventing wide use of pretensioners in vehicles, in particular motor vehicles, is the high expenditure involved. Considerable savings compared with pretensioners having a pyrotechnical drive are achieved by using mechanical drives in which a force accumulator in the form of a spring held in tensioned state is used, said spring suddenly relaxing in a pretensioning operation. The spring is held by a trigger mechanism in its tensioned rest state. The trigger mechanism includes a vehicle-sensitive mass which forms for example a pendulum which responds to vehicle deceleration and on reaching a predetermined initiation criterion activates the trigger mechanism so that the latter releases the spring.

The invention provides a pretensioner with a mechanical drive which is distinguished by simplicity, small expenditure, compact constructional form and low weight.

In the pretensioner according to the invention the spring forms an essential part of the sensor mass of the trigger mechanism. Since the spring is the sole source of force for the tightening operation and must be correspondingly strongly dimensioned, it has a considerable mass. This mass can be utilized for detecting and measuring vehicle deceleration. The spring is a helical spring and received in a guide tube which is pivotally mounted relatively to the vehicle-fixed retractor housing and biased by spring tension into a rest position. The initiation sensitivity can be set by dimensioning this spring tension The pivoting of the guide tube relative to the retractor housing is then a measure of the vehicle deceleration which has occurred. The pivot movement of the guide tube with the tensioned spring received therein against the spring tension governing the trigger threshold corresponds to an integration of the deceleration values which have occurred with respect to time. The initiation takes place as soon as the guide tube has executed a pivotal stroke of predetermined magnitude relatively to the retractor housing.

Further features and advantages of the invention will be apparent from the following description and from the drawings, to which reference is made and in which:

FIGS. 5 and 6 are schematic detail views of two alternative embodiments of an assembly securing means on the pretensioner.

Figure 2:
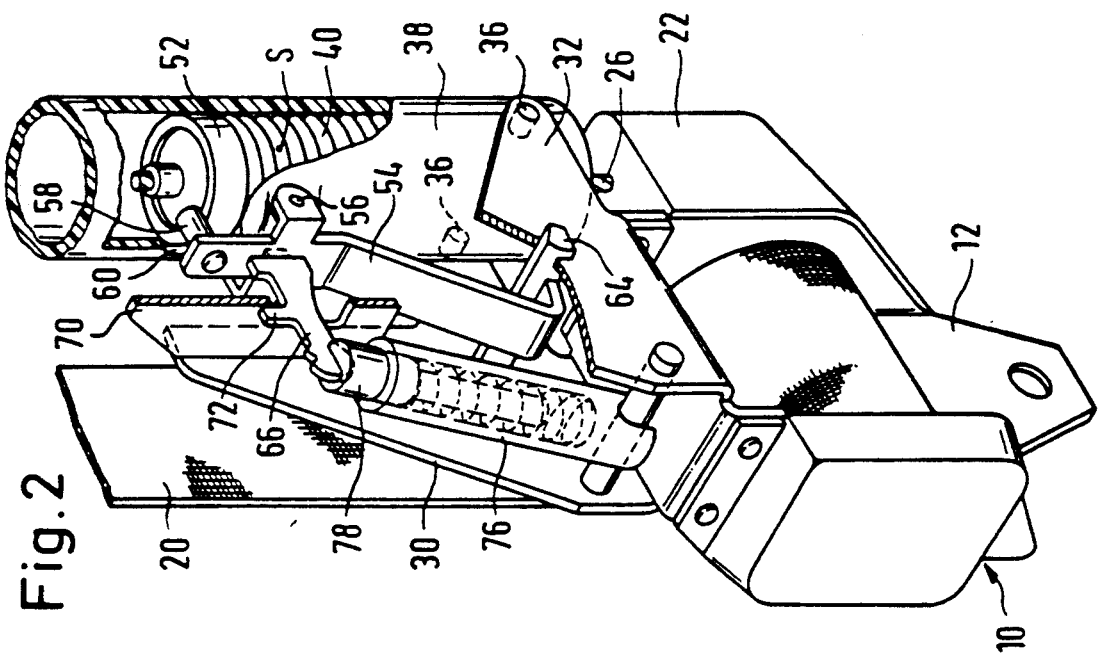
FIG. 2 is a partially sectioned schematic perspective view of the same belt retractor with a pretensioner.

With the embodiments described here of a pretensioner a belt retractor known per se is used and forms an assembly with the pretensioner. The belt retractor 10 is provided with a U-shaped loadbearing retractor housing 12 which is secured to a vehicle bodywork part by means of a screw. A shaft 18 on which the webbing 20 can be coiled is rotatably mounted in the retractor housing 12. Within a housing cap 22 there is a coupling mechanism which brings a lateral drive extension of the shaft 18 into drive connection with a pulley 24 as soon as the latter is driven with an abrupt angular acceleration. The one end of a pulling cable 26 is secured to the pulley 24 and coiled thereon; a mechanical linear drive of the pretensioner, which will now be described in detail, engages the other end of the pulling cable.

A bearing member 30 is rigidly mounted on the retractor housing 12. The bearing member 30 comprises at its end adjacent the belt retractor 10 two parallel bearing arms 32 arranged in fork manner. Between the bearing arms 32 a guide tube 38 is pivotally mounted on bearing journals 36. A helical spring 40 is received in compressed state in the guide tube 38. The helical spring 40 bears with its end adjacent the belt retractor 10 on the bottom of the guide tube 38; the opposite end of the helical spring 40 bears on the side of a piston 52 facing the belt retractor 10, said piston being received slidingly in the guide tube 38. The pulling cable 26 is secured in a bore 44 of the piston 52.

The helical spring 40 is held in the tensioned state in the guide tube 38 by means of a detent lever 54. The detent lever 54 is made two-armed and pivotally mounted on the guide tube 38. The pivot axis 56 of the detent lever 54 lies somewhat higher than the centre S of gravity of all the parts which are pivotally movable with the guide tube 38 and of which the helical spring 40 has by far the greatest mass. At the end of the one arm of the detent lever 54 a holding nose 58 is formed which projects through an opening 60 of the guide tube 38 into the interior thereof and engages the surface of the piston 52 remote from the helical spring 40. The other arm of the detent lever 54 is bent upwardly to a holding surface 62 which is formed on a support beam 64 which extends transversely of the longitudinal direction of the detent lever 54 and is mounted in the bearing member 30. The pivot axis of the detent lever 54 lies radially outside the engagement surface of the holding nose 58 on the piston 52. As a result, a moment caused by the tension of the helical spring 40 arises at the detent lever 54 and tends to pivot the latter anticlockwise. Thus, a socalled opening moment occurs at the detent lever 54. By this opening moment the bent-over end of the second arm of the detent lever 54 is pressed against the holding surface 62 of the support beam 64. Said holding surface is slightly curved with a radius corresponding to its distance from the axis of the bearing journals 36.

A laterally projecting cantilever arm 66 is mounted on the detent lever 54 substantially at the height of the pivot axis 56. The cantilever arm 66 extends through an opening 68 of a transverse wall 70 of the bearing member 30. The cantilever arm is provided with a flange-like widening 72 which engages the transverse wall 70. The transverse wall 70 forms a stop for the flange-like widening 72 of the cantilever arm 66 to define a stable rest position of the guide tube 38. The guide tube is biased into this rest position by a pressure spring 74 which is received in a guide tube 76 pivotally mounted on the bearing member 30 and bears with its one end on the bottom of the guide tube 76. The other end of the pressure spring 74 bears on a piston 78 displaceable in the guide tube 76. The piston 78 is provided on its side remote from the pressure spring 74 with a slot which has a rounded bottom and into which the partially circular free end of the cantilever arm 66 engages.

The mode of operation of the pretensioner will now be described. The belt retractor 10 is installed into the vehicle in such a manner that the axis of the pivot bearing of the guide tube 38 extends transversely of the vehicle longitudinal direction and the bearing member 30 is directed towards the front side of the vehicle. On vehicle deceleration, inertial forces act on the centre S of gravity and tend to pivot the guide tube 38 with the helical spring 40 anticlockwise in FIG. 1 and against the spring tension of the pressure spring 74. The threshold at which a pivoting of the guide tube 38 takes place is governed by the dimensioning of the spring tension of the pressure spring 74. On pivoting of the guide tube 38 the detent lever 54 is moved translationally along a circular arc, the centre point of which is the pivot axis of the guide tube 38. The bent-over free end on the second arm of the detent lever 54 slides over the holding surface 62 of the support beam 64. After a pivot movement of the guide tube 38 of a few degrees the free end on the second arm of the detent lever 54 moves beyond the end edge of the holding surface 62. The detent lever 54 can now yield to the pressure of the helical spring 40 exerted via the piston 52 on the detent nose 58 so that the detent lever 54 is abruptly released and executes a pivoting anticlockwise. The helical spring 40 now relaxes abruptly and moves the piston 52 upwardly in the guide tube 38. At the same time a tension engaging the periphery of the pulley 24 is exerted on the pulling cable 26. The pulley 24 is suddenly set in rotation. The coupling arranged in the housing cover 22 establishes a drive connection between the pulley 24 and a drive extension of the shaft 18. The rotational movement of the pulley 24 is therefore transmitted to the shaft 18 so that the webbing 20 is wound onto the shaft 18 to eliminate any belt slack in the safety belt system.

In the trigger mechanism described above the helical spring 40 with the guide tube 38 is used as vehicle-sensitive sensor mass. However, of these two components the helical spring 40 has by far the greater mass because the guide tube 38 may consist of a material of low weight, for example plastic. If it is remembered that a trigger mechanism having a vehicle-sensitive sensor mass must apply considerable initiation forces in order to be able to release the helical spring 40 subjected to a high pretensioning of for example 2000 N at an exactly and reproduceably predefined vehicle deceleration value, it will be clear that the elimination of a separate vehicle-sensitive sensor mass results in a considerable saving of weight and overall size. The use of a helical spring as force accumulator has the great advantage that the assembly consisting of belt retractor and tightening means is very close in shape and outer dimensions to conventional designs of assemblies with pyrotechnical tightening drive. Since the bearing member 30 need not take up any high force it may also be made from plastic or another light and cheap material.

Figure 1:
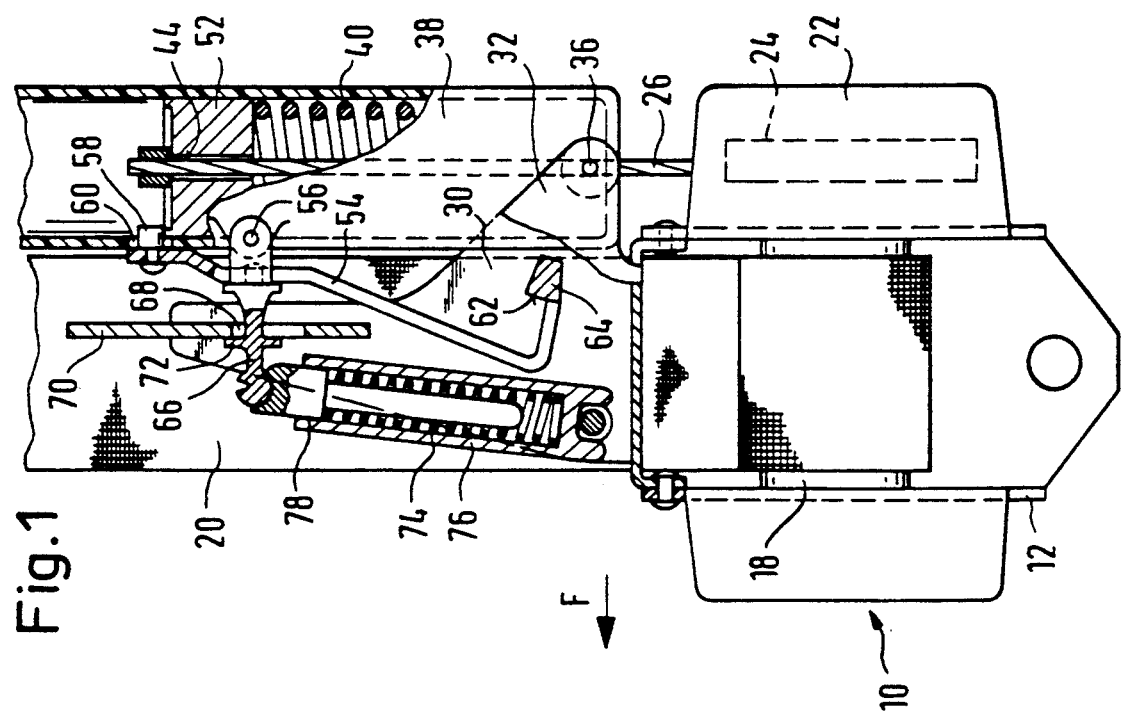
FIG. 1 shows a schematic view, partially in longitudinal section, of a first embodiment of a belt retractor with a pretensioner.
Figure 3:
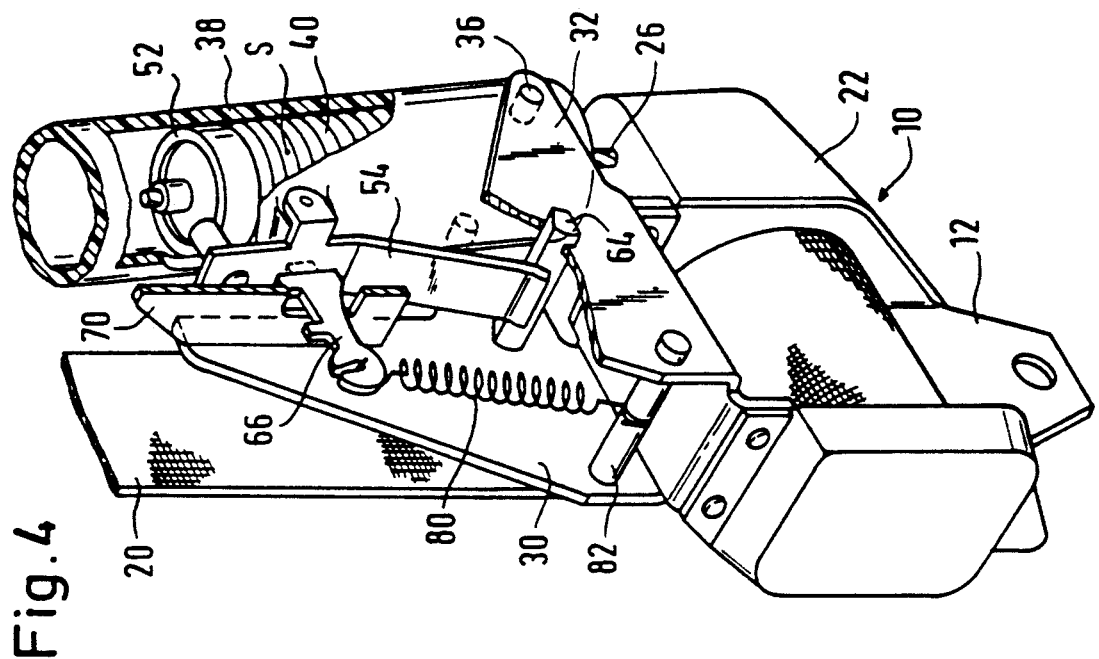
FIG. 3 is a schematic view, partially in longitudinal section, of a second embodiment of a belt retractor with a pretensioner.
Figure 4:
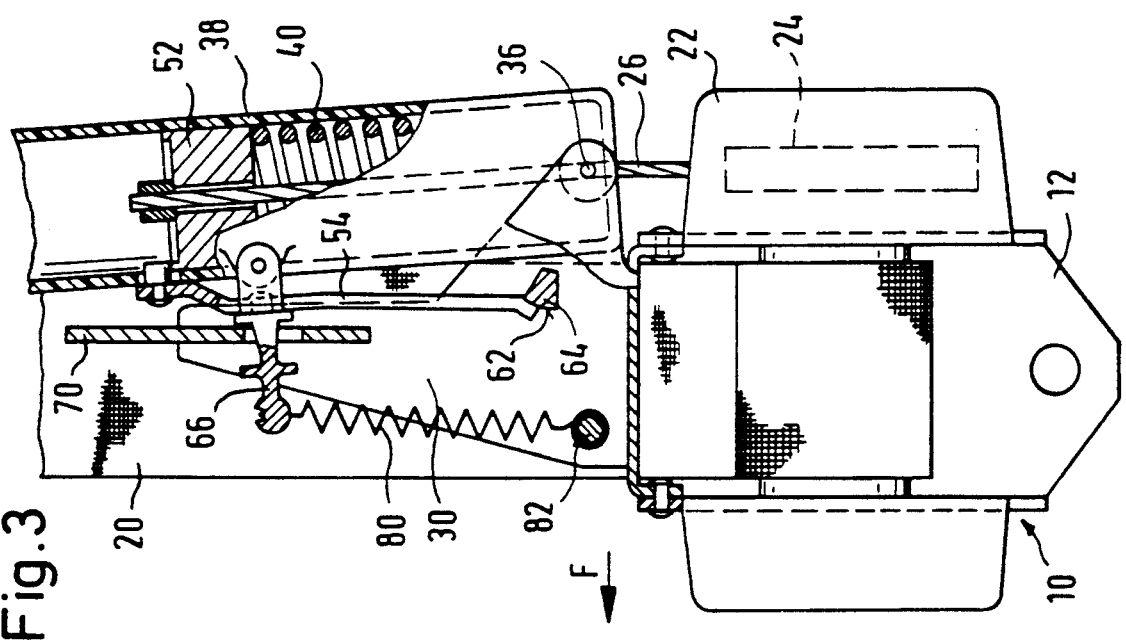
FIG. 4 is a partially sectioned schematic perspective view of the belt retractor with a pretensioner according to FIG. 3.

The embodiment according to FIGS. 3 and 4 differs from that according to FIGS. 1 and 2 mainly by the direction in which the guide tube 38 is pivoted relatively to the belt retractor 10. The assembly consisting of belt retractor and pretensioner is installed in the vehicle so that the guide tube 38 is at the front in the travelling direction. The travelling direction is indicated by an arrow F in each of FIGS. 1 and 3. Due to the modified installation situation some changes compared with the embodiment according to FIGS. 1 and 2 result. The guide tube 38 is biased by a tension spring into a pivoted rest position which is defined by a flange-like widening of the cantilever arm 66 coming to bear on the adjacent surface of the transverse wall 70. The tension spring 80 is secured with its one end to the free end of the cantilever arm 66 and with its other end to a pin 82 which is mounted between the side walls of the bearing member 30. The free end of the second arm of the detent lever 54 is slightly bevelled so that it lies parallel to the holding surface 62 of the support beam 64.

In the embodiment shown in FIGS. 3 and 4 the guide tube 38 is pivoted clockwise under the action of retardation forces at which an activation of the pretensioner is to take place, the free end on the second arm of the detent lever 54 sliding over the holding surface 62 until it passes beyond the end edge thereof. As in the embodiment previously described, the detent lever 54 then releases the piston 52 so that the helical spring 40 abruptly relaxes. The pretensioner operation takes place in the same manner as in the embodiment previously described.

FIG. 5 and 6 each show an assembly securing means which ensures that no unintentional release of the helical spring 40 can take place until the assembly consisting of belt retractor and tightening means has been installed in the vehicle. This assembly securing means consists in both cases of a two-armed blocking lever 80 which is pivotally mounted on the bearing member 30 and which with the end of its one arm engages the cantilever arm 66 for as long as said assembly is not installed in the vehicle. The blocking lever 80 is biased into this blocking position by a spring 82. The other arm of the blocking lever 80 is configured as sensing lever which cooperates with a surface on the vehicle bodywork and is depressed by the latter in the installation state of the belt retractor, the other arm of the blocking lever 80 thereby releasing the cantilever arm 66.

In further embodiments not shown in the drawings the retractor and pretensioner are made as separate assemblies. If required and depending upon the installation situation the pulling cable is then led via deflection means, preferably via a guide pulley running with low friction.

I claim:

1. A safety belt pretensioner on a belt retractor for vehicles comprising a mechanical drive having a pretensioned helical spring and engaging a shaft of said belt retractor, and a trigger mechanism having a vehicle-sensitive sensor mass and a detent lever pivotally mounted on a guide tube, said detent lever normally holding said helical spring in a pretensioned state to provide a biasing force and releasing said spring in vehicle-sensitive manner for initiating a belt pretensioning operation, said helical spring being received in said guide tube, said guide tube being mounted pivotally about a pivotal axis relatively to a housing fixed to said belt retractor and spring biased into a rest position, said helical spring forming an essential part of said sensor mass, and said guide tube pivoting with said helical spring under the action of inertial forces occurring upon vehicle deceleration to release said detent lever.

2. The pretensioner according to claim 2, wherein said guide tube is mounted on a bearing member fixedly connected to the belt retractor.

3. The pretensioner according to claim 2, wherein said bearing member is provided with a stop for defining said rest position of the guide tube.

4. The pretensioner according to claim 2, wherein said bearing member comprises two bearing arms which are arranged in a fork-like manner and between which the guide tube is pivotally mounted.

5. The pretensioner according to claim 1, wherein said helical spring has a first end bearing on said guide tube and a second end bearing on a piston displaceable in said guide tube, and said detent lever engaging said piston.

6. The pretensioner according to claim 5, wherein said detent lever has a first arm with an end provided with a holding nose and a second arm with a free end bearing on an abutment face of said housing.

7. The pretensioner according to claim 6, wherein said free end of the second arm of the detent lever, on pivoting of said guide tube, slides over said abutment face until it moves beyond an end edge thereof, said detent lever then being pivoted under the action of the biasing force of said helical spring until said holding nose releases said piston.

8. The pretensioner according to claim 7, wherein said abutment face has a curvature with a radius which is at least approximately equal to its distance from said pivotal axis of said guide tube.

9. The pretensioner according to claim 7, wherein said pivotal axis is located at an end of the guide tube adjacent the retractor.

10. The pretensioner according to claim 7, wherein said detent lever has a pivot axis located in a manner so that said detent lever is biased by the biasing force of said helical spring to develop a moment in a direction to move said holding nose away from said piston.

11. The pretensioner according to claim 1, wherein said helical spring urges on a piston received in said guide tube and connected to a cable partially wound on a pulley, said pulley being adapted to be connected to a shaft of said belt retractor for joint rotation therewith.

12. The pretensioner according to claim 1, wherein said guide tube is arrestable in its rest position by means of a security device.

13. The pretensioner according to claim 1, wherein said tensioned helical spring, said guide tube and members connected to the latter have a common center of gravity spaced from the pivotal axis of said guide tube a smaller distance than the pivot axis of the detent lever.

14. The pretensioner according to claim 5, wherein said detent lever is provided with a laterally projecting cantilever arm on which a spring engages for biasing the guide tube into its rest position.

15. The pretensioner according to claim 1, wherein said cantilever arm is arranged substantially at the level of the pivot axis of the detent lever.

16. The pretensioner according to claim 1, wherein said spring is a pressure spring which is arranged in a guide tube pivotally mounted on the housing.

17. The pretensioner according to claim 1, wherein said spring is a tension spring which is attached with a first end to the housing and with a second end to the cantilever arm.

* * * * *

UNITED STATES PATENT AND TRADEMARK OFFICE
CERTIFICATE OF CORRECTION

PATENT NO. : 5,265,813

DATED : November 30, 1993

INVENTOR(S) : Artur Fohl

It is certified that error appears in the above-identified patent and that said Letters Patent is hereby corrected as shown below:

Column 5, line 3, change "2" to --1--.

Column 6, line 17, change "1" to --5--.

Column 6, line 26, change "1" to --14--.

Column 6, line 29, change "1" to --14--.

Column 6, line 32, change "1" to --14--.

Signed and Sealed this

Third Day of May, 1994

BRUCE LEHMAN

*Attest:*

*Attesting Officer*     *Commissioner of Patents and Trademarks*